United States Patent [19]
Friebe

[11] 3,878,865
[45] Apr. 22, 1975

[54] PROGRAMMABLE PNEUMATIC CONTROL SYSTEM

[76] Inventor: Kurt Friebe, Karlsruhe-Durlach, Germany

[22] Filed: Aug. 9, 1972

[21] Appl. No.: 279,165

[30] Foreign Application Priority Data
Apr. 28, 1967 France..........................67.522794

Related U.S. Application Data
[60] Division of Ser. No. 79,796, Oct. 12, 1970, abandoned, which is a continuation-in-part of Ser. No. 721,760, April 16, 1968.

[52] U.S. Cl............................. 137/608; 137/596.14
[51] Int. Cl............................................. F16k 31/12
[58] Field of Search.......... 137/596.14, 596.15, 596, 137/596.16, 608

[56] References Cited
UNITED STATES PATENTS
2,650,609  9/1953  Herbst .......................... 137/596.14
3,232,316  2/1966  Carlisle....................... 137/596.16 X

*Primary Examiner*—Robert G. Nilson
*Attorney, Agent, or Firm*—Kurt Kelman

[57] ABSTRACT

A programmable pneumatic control system for use with high or low pressure fluids, e.g., compressed air, from 100 to 500 mm water head. One embodiment comprises a matrix-like array of input ducts and output ducts with a cross-duct at each matrix cross-point. A check-valve is positioned in each cross-duct to inhibit return flow of air from the output ducts to the input ducts. Each cross-duct may be selectively closed to program the operation of the system which is considerably less complex than prior art systems.

8 Claims, 14 Drawing Figures

PROGRAMMABLE PNEUMATIC CONTROL SYSTEM

CROSS REFERENCES TO RELATED APPLICATIONS

This application is a division of my copending application Ser. No. 79,796, filed Oct. 12, 1970, now abandoned, which is a continuation-in-part of my application Ser. No. 721,760, filed Apr. 16, 1968 now abandoned.

BACKGROUND OF THE INVENTION a. Field of the Invention

Broadly speaking, this invention relates to pneumatic control systems. More particularly, in a preferred embodiment, this invention relates to a programmable pneumatic control system having a plurality of orthogonally oriented input and output manifolds to control industrial operations and switching events.

b. Discussion of the Prior Art

In recent times, proposed solutions to the problem of the control of industrial processes include the use of a compressed fluid, for example air, as a medium to transmit control signals. If, for example, the piston of a working cylinder is moved in a first direction, a rod connected to the piston can, by actuating a spring-loaded valve, not only terminate further motion of the piston but, in addition, reverse the direction of motion, if desired. Such a function can be provided by any of several conventional means and the number of control elements is minimal. Also the physical arrangement of the control ducts does not present any difficulty.

The problem becomes more complicated, however, if a plurality of operating cylinders are employed, each of which performs different, but interrelated and interdependent tasks. The nature of this problem demands that, since the number of controlling linkages is greater, the tasks to be performed be correspondingly more complex. The system of control ducts must, of necessity, include a large number of manifolds, and the multitude of interconnections causes the arrangement of ducts to be entangled to such an extent that, in the event of a malfunction, even a specialist may face in insurmountable service problem.

In addition, in one known pneumatic control system, the fluid which actuates the control valves is a stream of air under a minimum of pressure, for example, from 100 to 500 mm water head. The stream of air flows, therefore, and in laminar fashion which makes it possible to have the air flow past two oppositely positioned orifices, without being diverted sideways. As soon as a lateral flow is induced, the relatively weak main flow is disturbed by the resulting turbulence and air can escape. Similarly, at a fork in the air stream, the controlling flow of air can be made to change direction. Thus, the application of a simple burst of air pressure, at the fork, can effect a change in direction in the main stream.

The above-described, low-pressure system has the advantage that no moving parts are required. However, it does suffer from a disadvantage which leads to frequent errors and malfunctions. Ignoring for the moment that depending on the task to be performed, the number of interconnected ducts can be considerable, and the interconnections themselves complicated, because the operating fluid is under such a relatively low pressure, even a minor exterior disturbance can cause a system failure.

SUMMARY OF THE INVENTION

This invention proposes a solution to these problems and comprises a pneumatic control system in which the system of ducts is reduced to an absolute minimum. The invention employs a relatively uncomplicated layout and may readily be adapted to handle a different control program. More specifically, the control system comprises a plurality of parallel, spaced-apart input ducts that are connected via a set of input valves, to a source of compressed fluid, e.g. air. The input ducts are positioned orthogonally a short distance above a corresponding set of parallel, spaced-apart output ducts forming a matrix-like array having a plurality of cross-points. A closeable cross-duct interconnects each output duct to each input duct, at the cross-points. Advantageously, a set of output valves are associated with the output ducts to control the operating fluid. These output valves may be omitted if the pressure of the operating fluid is low. To inhibit a return flow of air from the output ducts to the input ducts, a checkvalve may be positioned in each cross-duct.

One special advantage of this invention is the ease with which a control program may be programmed. To this end, slide-valves are positioned in each cross-duct and, when closed, these slide-valves block the flow of air from the input duct to the corresponding output duct. Similarly, when opened, the slide-valves permit the flow of air from the input ducts to the output ducts.

Another aspect of this invention is the provision of controllable valves at the input ducts to facilitate the handling of complex control problems. These controllable valves may be arranged to pass a secondary stream of air, when they are open, into the input ducts. In this manner, an input signal, in the form of a blast of air, causes the controllable valve to let a steady stream of controlling air pass through. On the other hand, the controllable valves can be so arranged that a steady stream of air is converted into a blast of air, if desired. When properly arranged, impingement of the steady stream of air can be made to close the controllable valve automatically.

Different types of valves, for example valves employing membranes or gaskets, may be used instead of the controllable valves. Also, to permit remote electrical control, electromagnetic valves may be employed in the input ducts. Further, a special corner unit may be used at the corner of the matrix to exhaust the system, to disable the system completely or to assist in start-up.

The control system according to this invention, may be used with low pressure fluid as well as with a high pressure fluid. In this event, a supply main is used to which all output ducts are connected. Low pressure fluid thus flows through the output ducts and causes the output valves connected thereto to be premanently closed.

At each cross-over point, the output ducts have lateral openings which may be considered to be continuations of the cross-ducts. If the control valve in a cross-duct is open, the flow of controlling fluid originating in the input duct causes the relatively weak air flow to be blocked by turbulence, thus preventing fluid flow into the corresponding output valve.

If control valves are associated with the input valves they may comprise valves using either pistons or membranes. In any event, the active valve area facing the opening end is made larger than the active area facing the closing end. Thus, the force applied to the opening end is greater than that applied to the closing end. Input signals, which impinge upon the closing end of all control valves, through the check-valves which are associated with and part of the input valves, appear simultaneously on the opening side of the particular control valve associated with the input signal. Thus, the latter is opened while all other control valves remain closed.

In the prior art, complex control programs often cause output valves to be erroneously actuated or to go to an actuated state even when an output signal therefrom is not permitted. According to this invention, the input signal may be used, not only to switch the corresponding stage of the control system, but a specially provided duct may be arranged to activate a corresponding control element in the next stage, all other control elements being blocked. To this end, one embodiment of the invention includes an input stop valve which is normally not operated and which does not pass any signals. Through a control duct, the preceding input valve, which is ahead of the input stop valve, is activated to open the input stop valve, while all the other input valves are maintained in a closed position by either a spring or a continuous flow of pressurized fluid. Therefore, the control program runs its course independent of, and unaffected by, any other control signals, as no other control signals will have any effect. This feature can, of course, be bypassed or only applied in part to the system, so that repetitions of part, or all, of the control program are possible.

To ensure trouble-free operation it is necessary to exhaust the ducts which are pressurized before the next program step is initiated. This can be done by connecting the closed side of all the control valves of each stage to an interconnecting duct which is connected to the external atmosphere by a choke valve. The performance of the system can be improved, and accelerated, by preceding each stage with a safety valve to guarantee exhausting. The safety valve comprises a check valve which opens only after the closing end of the check valve is exhausted. The check valve comprises an input duct and two output ducts of which the first, after the check valve is activated, passes the input signal to the opening end of the corresponding control valve. The second output duct feeds the input signal to the closing end of all control valves.

If the program steps follow each other very rapidly, the exhausting of the ducts may be performed, before the start of the next step, by positioning an exhaust valve ahead of each control valve. The exhaust valve has two chambers which open simultaneously, one of which is connected to the closing end of the control valve, the other to the opening end thereof. Thus, a control signal received over a control duct will open chambers simultaneously.

If, with high speed switching, the exhausting through nozzles proves to be inadequate, an alternative embodiment of the invention includes a main air tank and a main exhaust valve which can be included, for example, in one of the corner units of the matrix or in a termination for the system. The input signal is fed through a check valve, then through a duct, into the air tank. Simultaneously, however, a main exhaust valve is closed. Thus, the air passes from the tank to a throttle in the duct, thence to the closing end of the control valve and to the main exhaust valve. From there, one duct opens all exhaust valves, thereby exhausting the opening and closing ends of the control valve. Thus, no choke is required.

Additional objects and features of the invention will become apparent from the following detailed description, and the drawings, in which:

DETAILED DESCRIPTION OF THE INVENTION

Figure 1:
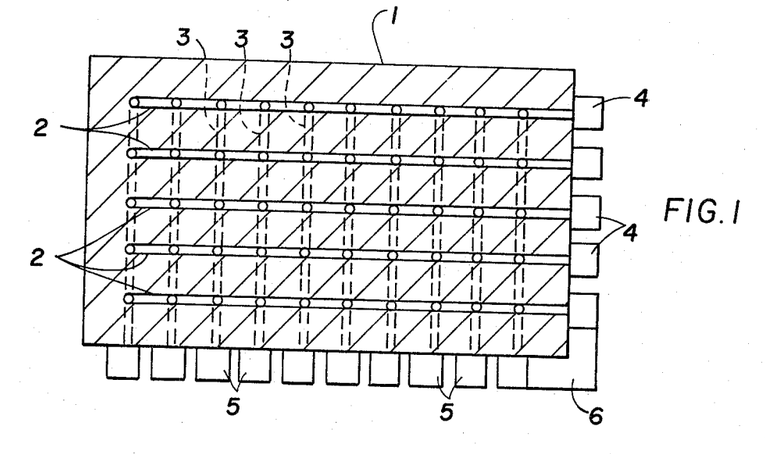
FIG. 1 is a plan view of an illustrative hydraulic control system, according to this invention.

FIG. 1 depicts an illustrative embodiment of the invention. As shown, control block 1 comprises a plurality of substantially identical, horizontally disposed first channels 2 spaced-apart from one another at regular, predetermined intervals. Channels 2 act as input ducts and, in the embodiment illustrated in FIG. 1, the input ducts are stacked vertically one above the other. A corresponding plurality of substantially identical, vertically disposed second channels 3 are positioned behind channels 2. Channels 3 act as output ducts and, like channels 2, are also spaced-apart from one another at regular intervals. Channels 2 and 3, taken together, form a matrix-like array of cross-points therebetween.

A plurality of input valves 4 are positioned at input ends of channels 2 and a corresponding plurality of output valves 5 are positioned at the output ends of channels 3. A corner unit 6 is positioned proximate the last channel 2 and the last channel 3; this unit is described in more detail below.

Figure 2:
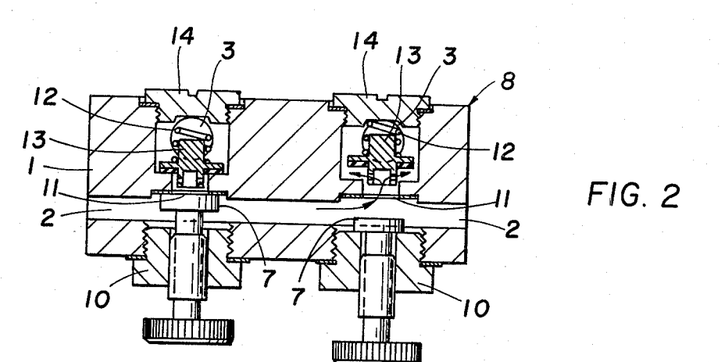
FIG. 2 is a cross-sectional view of two cross-points in the system illustrated in FIG. 1.

Control block 1 is advantageously fabricated from a plurality of substantially identical "building blocks." A cross-sectional view of a typical building block is shown in FIG. 2 wherein building block 8 includes two cross-points between a single input duct 2 and two output ducts 3. The actual connection between an input duct 2 and an output duct 3 is by means of a cross-duct 11.

A piston 7, slidably mounted in a collar 10, is positioned proximate each cross-duct and, when actuated, seals the corresponding cross-duct, thereby inhibiting fluid flow between the input duct and the output duct. In FIG. 2, the left piston is shown closed while the right piston is shown open. A checkvalve 13 is shown positioned in each of the cross-ducts 11. A spring 12 associated with each checkvalve 13 normally biases the checkvalve into the closed position. A threaded screw top 14 is positioned in building block 8, directly behind each cross-duct 11, to permit access to and removal of the corresponding checkvalve.

Figure 3:
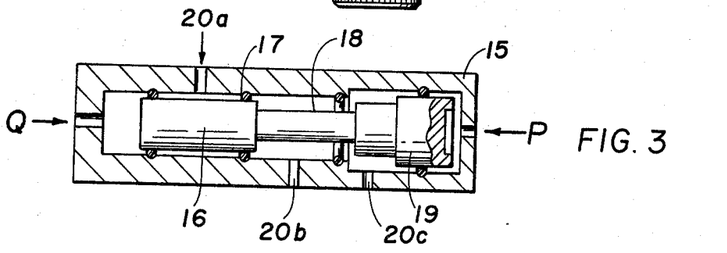
FIG. 3 depicts an illustrative control valve which may be used with the system illustrated in FIG. 1.

FIG. 3 illustrates one type of valve which may advantageously be used as the input valve 4 depicted in FIG. 1. As shown in FIG. 3, control valve 15 comprises a shaft 16 having a piston-like member 19 formed at one end thereof. Shaft 16 is mounted for lateral displacement within the body of valve 15 by means of a plurality of annular gaskets 17. Shaft 16 has an annular groove 18 formed therearound, and when shaft 16 is properly positioned in the valve, groove 18 interconnects input control duct 20a and output control duct 20b. When so positioned a, blast of air P applied to the surface of piston 19 is converted into a steady stream of air. Piston 19 can be returned to its original position by a second blast of air Q applied to the opposite end of shaft 16, as shown. When in the rest position, air applied through output duct 20b is vented to the atmosphere through relief duct 20c.

Figure 4:
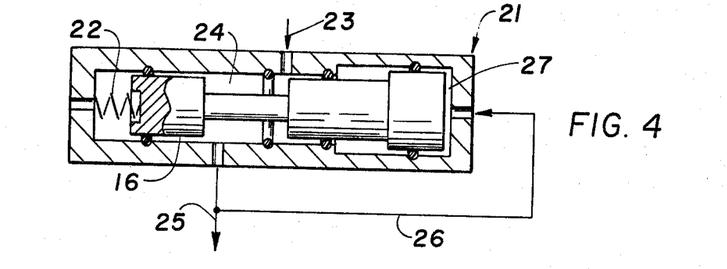
FIG. 4 depicts an alternative embodiment of the valve shown in FIG. 3.

FIG. 4 similarly illustrates a control valve which may advantageously be used as the output valve 5 depicted in FIG. 1. As shown in FIG. 4, control valve 21 is similar to control valve 15 of FIG. 3, except for a pressure spring 22 which normally biases the valve shaft to the rest position. However, because the input duct 23 and the output duct 25 of valve 21 are arranged differently from input duct 20a and output duct 20b of valve 15, when valve 21 is in the rest position, air flowing into the valve through input duct 23 and an annular groove 24 exits therefrom through output duct 25 and, by means of a branch duct 26, also impinges on the face 27 of the valve piston. This, in turn, will force the valve shaft to the left, against the bias of spring 22. Thus, the flow of air from input duct 23 to output duct 25 is terminated and instead of a steady stream of air an impulse is passed on.

Figure 5:
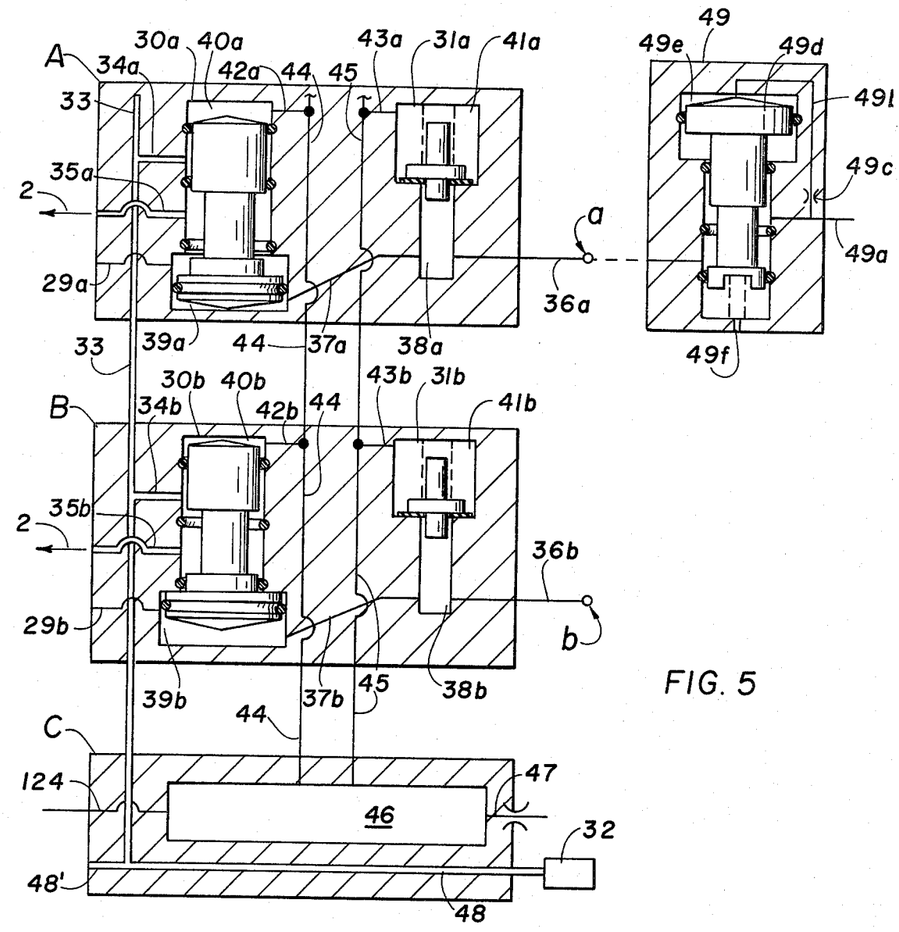
FIG. 5 depicts one arrangement for the valves shown in FIGS. 3 and 4.

FIG. 5 illustrates a typical interconnection of several control valves. As shown, the arrangement includes first and second input valve stages A and B, respectively.

Stage A is identical to stage B, the reference numerals designating identical parts of the two stages having added thereto in the drawing the letters a and b, respectively, and both work in unison. Either could be used as an input valve 4 in FIG. 1.

Each stage comprises a control valve 30 and a checkvalve 31. A source of compressed air 32, or other suitable operating fluid, is connected by a series of ducts 48, 33 and 34 to the input of control valve 30. The output of control valve 30 is connected via a duct 35 to an input duct 2 of the control block 1 shown in FIG. 1.

The input signal is applied via duct 36 to the control end 38 of checkvalve 31, thence via duct 37 to the control end of control valve 30. The output end 40a of control valve 30a in stage A is connected, via ducts 42a and 44, to the corresponding output end 40b of control valve 30b in stage B and to an air reservoir 46. The output end 41a of checkvalve 31a in stage A is connected via ducts 43a and 45 with the corresponding output end 41b of checkvalve 31b stage B, thence to reservoir 46. A choked outlet 47 connects reservoir 46 to the atmosphere. The annular groove of each valve 30 is vented via a duct 29 when in the rest position.

The operation of the two input valve stages A and B is as follows: A blast of air reaching stage A via duct 36a is fed by duct 37a to the input end 39a of control valve 30a. This opens the valve and, as a result, compressed air from source 32 flows via ducts 48, 33, and 34a through the annular groove of valve 30a (now open) to the output duct 35a. Simultaneously, the input signal applied over duct 36a opens checkvalve 31a, and air flows via ducts 43a and 45 into reservoir 46. The pressure which builds up in reservoir 46 and in ducts 44, 42b, impinges upon the closing end of control valve 30b forcing it to the rest position, in the absence of an input signal at the opening end 39b of valve 30b. The air which escapes from reservoir 46 through choked aperture 47 eventually reduces the pressure therein and exhausts the reservoir as well as ducts 42a, 42b, 43a, 43b, 44 and 45.

Now, if an input signal is applied to stage B via duct 36b, control valve 30b is opened in an analagous manner and compressed air from source 32 will flow via ducts 48, 33, 34b and the annular groove in valve 30b (now open) into duct 35b. Simultaneously, valve 30a is forced back to the rest position by the pressure built up in reservoir 46 and ducts 44 and 42a which is, connected to the closing end 40a of the valve 30a. The opening in choked aperture 47 is adjusted so that the pressure which is built up in reservior 46 is sufficient to reset either valve, without any input signal present. On the other hand, the opening in choked aperture 47 must be sufficiently large that reservoir 46 and its interconnected ducts are exhausted completely before a new input signal actuates valves 30a and 30b. Optionally, reservoir 46 and duct 45 can be omitted and the air from ducts 43a and 43b can be led to duct 44, which would of course have to be provided with a choked aperture similar to aperture 47. Any number of input stages similar to stages A and B can be interconnected. It will be observed that the configuration depicted in FIG. 5 guarantees that, if any one stage is actuated, all the remaining stages are either reset to, or remain in, the rest position.

The arrangement shown in FIG. 5 must be driven by an input signal which comprises a blast of air applied to ducts 36a, 36b, etc. This is so because the input signal must be dissipated before another input signal can be applied to some other stage. This can easily be accomplished by using an impulse-coupler, such as the well-known impulse-coupler 49 shown in FIG. 5 connected to stage A.

The input signal applied to duct 49a is fed through the annular ring of valve 49 (now open) to duct 36a. At the same time, the signal is passed through duct 49b to piston 49d which closes after a delay sufficient to fill air space 49e, thereby exhausting ducts 36a and 49a through aperture 49f. Advantageously, the control valve, checkvalve and optional impulse converter are assembled together from building blocks as is FIG. 1. Stage C of FIG. 5, which includes air reservoir 46, may also comprise a building block and actually constitutes the corner unit 6 shown in FIG. 1. In that event, air is supplied to each of the output valves 5 by duct 48' (FIG. 5).

To ensure the proper operation of the arrangement shown in FIG. 5, it is necessary to vent ducts 44 and 45 prior to the application of a new input signal to duct 36a or duct 36b. Venting of the ducts is particularly important if an impulse converter is used. If ducts 44 and 45, for example, were not properly exhausted, then improper and erroneous operation would be expected for the upper ends of valves 30a and 30b would still be under pressure. For very fast switching times, from one stage to the other, it is, equally necessary that the venting of the ducts be carried out as rapidly as possible. To avoid erroneous operation, it is desirable to block the whole system while ventilation is being performed.

Figure 6:
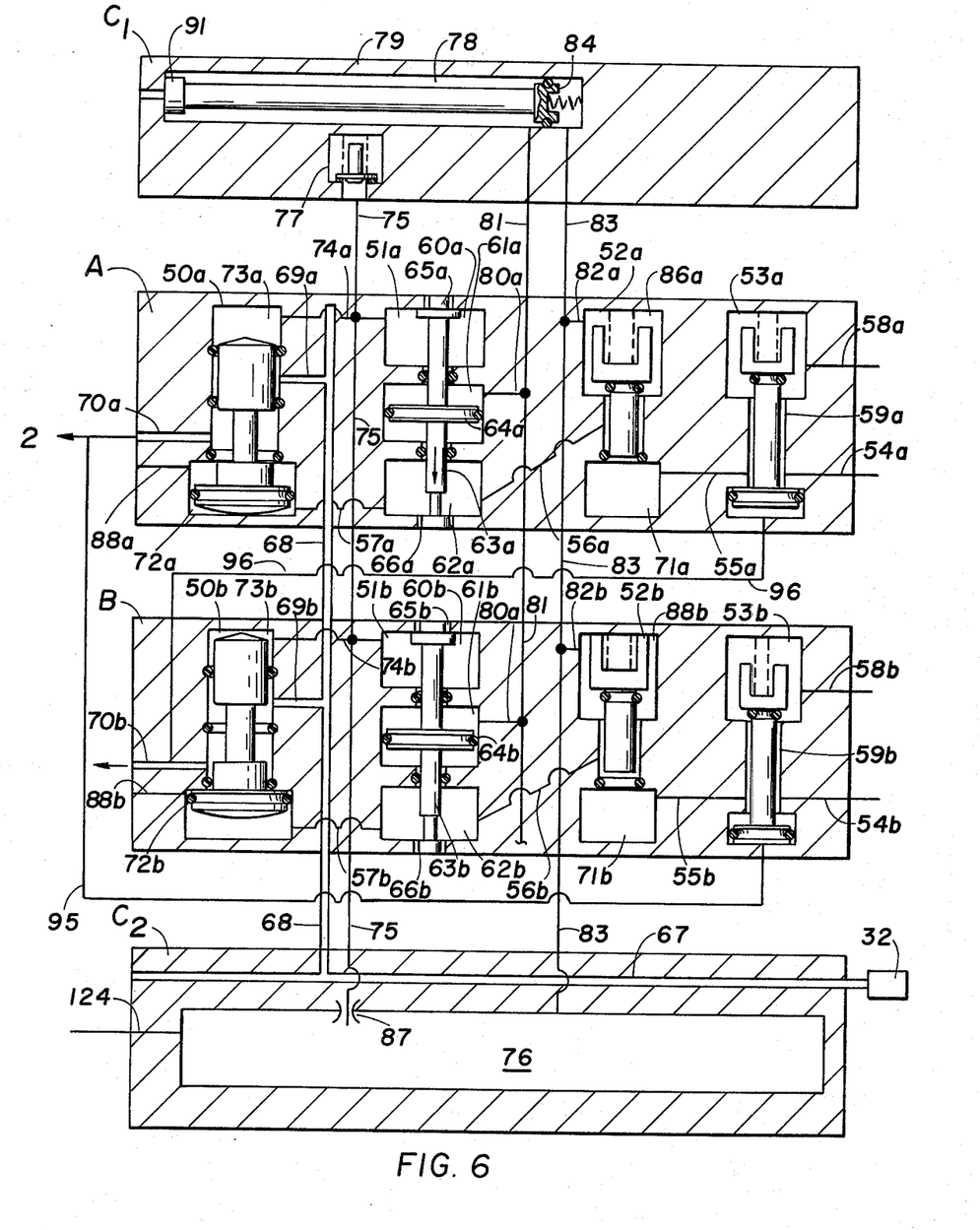
FIG. 6 depicts an alternative arrangement for the valves shown in FIGS. 3 and 4.

FIG. 6 illustrates yet another embodiment of the invention comprising two input valve stages A and B. The arrangement shown in FIG. 6 avoids the venting problem discussed above, with reference to FIG. 5. As shown in FIG. 6, input valve stages A and B each comprise a control valve 50, an exhaust valve 51, a check valve 52 and an input-blocking valve 53. Control valve 50 corresponds to valve 30 in FIG. 5 and check valve 52 corresponds to valve 31 in FIG. 5. Each input-blocking valve has two input ducts 54 and 58. Input signals applied to duct 54 are fed, via annular groove 59 of the input-blocking valve 53, at all times, whereas input signals applied to duct 58 pass only when input-blocking valve 53 is actuated. Each ventilating valve 51 includes three contiguous cylindrical chambers 60, 61, and 62 traversed by a common piston rod 63. If the piston 64 on rod 63 within chamber 61 is actuated by compressed air, piston rod 63 moves downwardly, thus opening outlets 65 and 66 of chambers 60 and 62, respectively, thereby ventilating them. In an analagous manner to FIG. 5, a source of compressed air 32 is connected to the input of control valves 50 of stages A and B, via ducts 67, 68 and 69. The output of each control valve 50 is connected via a duct 70 to an input duct 2 of control block 1 (FIG. 1). The input signal is fed via duct 54 and 58, the input end 71 of the check valve 52, duct 56, cylindrical chamber 62 and duct 57 to the opening end 72 of control valve 50. The closing ends 73a and 73b 73 of control valves 50a and 50b are interconnected via ducts 74a and 74b and are connected, on the one hand, to cylinder chambers 60a and 60b, and on the other, via an adjustable air valve 87, to an air reservoir 76 and, via check valve 77, to main exhaust valve 79. The blocking and 86 of each check valve 52 is connected, via ducts 82 and 83, with the corresponding blocking end of the other, with the air reservoir 76 and with the end 84 of the main exhaust valve 79. In the neutral, or rest position, ducts 70 and the annular groove of control valves 50 are ventilated by ducts 88. Any number of input valve stages A and B can be stacked, one above the other, as desired. The stacked assembly would comprise the desired number of stages A, B, each comprising valves 50, 51, 52 and 53; stge C2 including air reservoir 76; and stage C1 including main exhaust valve 79. As before, advantageously, the assembly would be made from building blocks. Thus, the need for interconnecting pipes or tubes would be eliminated.

In operation, an input signal applied to ducts 54a and 58a of stage A is connected, via annular slot 59a of the *input-blocking valve 53a* and duct 55a, to the opening end 71a of check valve 52a. The air so applied forces the piston of check valve 52a to move, thus permitting the passage of air through the annular slot therein into duct 56a, thence via cylinder chamber 62a to the opening end 72a of control valve 52a, forcing the piston thereof to its open position. This, in turn, permits air to flow from source 32, via ducts 67 and 68, and open control valve 50a into duct 70a. Simultaneously, compressed air flows through the open check valve, ducts 82a and 83 into reservoir 76 and to the end 84 of the main exhaust valve 79. The air in reservoir 76 escapes slowly via escape valve 87 into duct 75, which also receives the air which escapes from the closing end 73a of control valve 50a. The air which arrives at the piston end 84 of main exhaust valve 79 moves the piston thereof to the left and closes its input 91. The pressure in duct 75 forces the piston of control valve 50b to its rest position and opens check valve 77 so that the air pressure travels, via piston end 78 of valve 79, duct 81, and cylindrical chambers 61a and 61b to force pistons 64a and 64b downward, thus exhausting cylindrical chambers 60a, 60b, 62a, 62b of ventilating valves 51a and 51b and at the same time closing ends 73a and 73b of control valves 50a and 50b, respectively, and opening ends 72a and 72b of control valves 50a and 52b, via ducts 57a and 57b respectively.

Duct 95, which connects the outlet end 70a of control valve 50a in stage A, to the control end of the input-blocking valve 53b in stage B causes, when control valve 50a is open, the piston of blocking valve 53b to be lifted, thus permitting stage B to react to signals present at duct 58b. So long as control valve 50a is at rest, input blocking valve 53b is also at rest and stage B will respond only to inputs applied to duct 54b.

Similarly, as described for stage A, input signals applied to ducts 58b or 54b reach stage B, causing control valve 50b to open thereby permitting compressed air to flow from the source 32, via ducts 67, 68 and 69a, through the open annular slot into the output 70b. The piston of control valve 50a then moves to its rest position, exhausting all ducts, as described for stage A.

Figure 7:
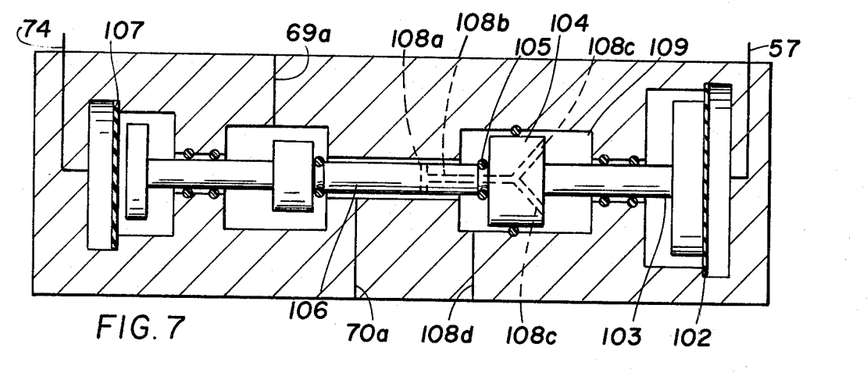
FIG. 7 illustrates a membrane type valve which may be used with the arrangement shown in FIGS. 5 and 6.

The output opening 70b of control valve 50b is connected, via duct 96, to the control end of input control alve 53a so that, when control valve 53b is open, input signals are applied to duct 58a of stage A. A membrane valve can be substituted for sliding control valve 30a or 50a, if desired. Such a membrane valve is shown in FIG. 7. The valve includes a large membrane 102 and a small membrane 107. The input signals from ducts 57a and 57b (FIG. 6) are applied to membrane 102, forcing piston 103 against piston 104 with gasket 105 and piston 104 against piston 106; both piston 104 and piston 106 will be moved to the left. Air can now flow from duct 69a into duct 70a and also, via bores 108a, 108b, and 108c into cylinder 109, pressing against piston 104, maintaining its position even if the input signal in duct 57 is removed. If, after the signal on duct 57 is removed, a signal appears in duct 74, piston 106 will be pressed against piston 104, mvoing the latter to the right. The control pressure can now escape through duct 108d. The membrane valve remains in the rest position even if the signal applied to duct 74 is removed.

The air in the output ducts 3 of block 1, FIG. 1, may be used to operate control cylinders or any other apparatus responsive to, and actuated by, compressed air. The air in output ducts 3 may also be used, of course, to actuate other control valves. Since cross-ducts 11, between input ducts 2 and output ducts 3, normally contain a check valve 13, air from the output ducts 3 can be returned through these check valves. It is thus necessary to exhaust the output ducts after termination of each program step.

Figure 8:
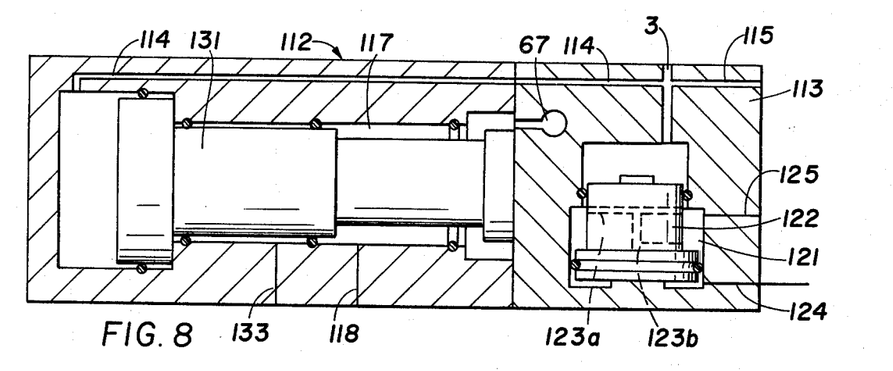
FIG. 8 illustrates the combination of an output valve of the type shown in FIG. 3, with an exhaust valve.
Figure 9:
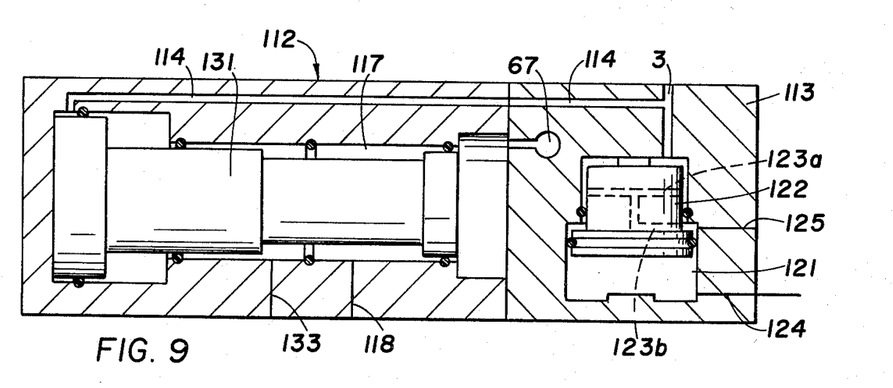
FIG. 9 is an alternative view of the arrangement shown in FIG. 8, with the control valve operated.

FIG. 8 illustrates an output valve 112 having such a ventilating element 113 associated therewith to ventilate the output ducts 3 of block 1 (FIG. 1). The valve in FIG. 8 is shown in its open position. FIG. 9 illustrates the same valve in its rest, or closed, position. Output valve 112 is shown as a sliding control, as in FIG. 3. Working pressure reaches the operating duct 118 from duct 67 (see also FIG. 6), via annular slot 117 of output valve 112. The compressed air in the output duct 3 (FIG. 1) is led, via duct 114, to the control end of the valve and moves piston 131 to its open position, as shown in FIG. 8. After the signal at the output duct 3 is removed, piston 131 is returned to the rest position by the air in duct 67, as shown in FIG. 9. Annular ring 117 and output duct 18 are exhausted by duct 133.

To ensure satisfactory operation of the output valve it is essential that ducts 3 and 114 are exhausted before application of the next control signal. One simple way to accomplish this ventilation is the pinhole 115 shown in FIG. 8, which is permanently open. Since the diameter of hole 115 is much smaller than that of ducts 3 and 114, air escaping through the pinhole while a signal is applied does not affect the operation of the valve to any noticeable degree. If any loss of air pressure, no matter how small, is to be avoided, then pinhole 115 can be replaced by a cylinder 121 with an exhaust piston 122. Piston 122 is provided with bores 123a and 123b. One side of the piston in cylinder 121 is connected to the output duct 3, and the other side of the cylinder, via duct 124, to the air reservoir 76 (see FIGS. 5 and 6). In the rest position, exhaust piston 122 is pressed down by air pressure from output duct 3 and therefore blocks escape duct 125. An exhaust element, similar to input blocking valve 53 may also be used.

Whenever a new program step is initiated, a pulse is transmitted from reservoir 76, via duct 124, and forces piston 122 upwards, thus exhausting ducts 3 and 114, via bores 123a and 123b of piston 122 and duct 125.

Advantageously, output valve 112 and exhaust valve 113 are built from separate building blocks, so that small, pressure-driven converters can be connected to exhaust valve 113 to actuate devices such as electrical sources or hydraulic valves. In this event, output valve 112 may be omitted.

Figure 10:
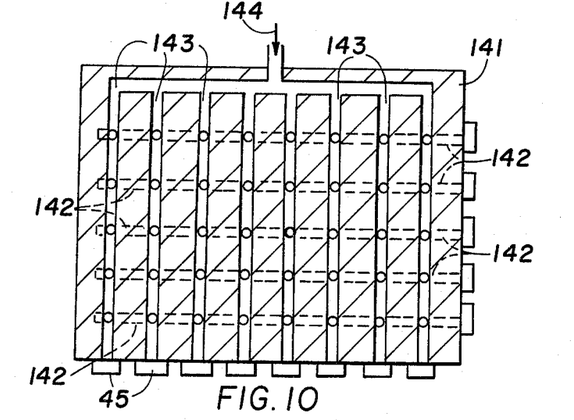
FIG. 10 is a schematic representation of an alternative embodiment of the control system shown in FIG. 1.
Figure 11:
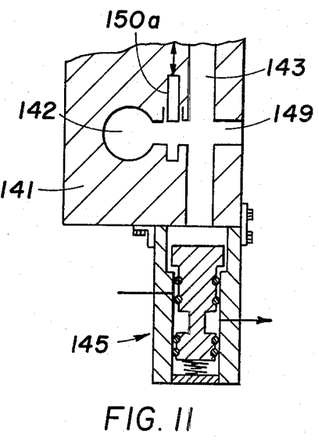
FIG. 11 is a cross-sectional view of a cross-point area of FIG. 10.

As shown in FIG. 10, the control system is activated by a source of low pressure air. A plurality of input ducts 142 are arranged in a housing 141 and, as in FIG. 1, are crossed by a corresponding plurality of output ducts 143. However, unlike FIG. 1, the output ducts 143 are connected via a common feeder duct 144 to the source of low pressure. At the rear of the output ducts 143, proximate the cross-points, there are a plurality of openings 149 (FIG. 11) which represent a continuation of the cross-duct. The other end of each output duct 143 comprises an output valve 145, for example, the control valve shown in FIG. 3 arranged so that it blocks working air pressure under control of a weak air flow. If at a cross-point the slide 150a (FIG. 11) is open, and if for the corresponding input 142 the input valve is open, then at the cross-point this control flow disturbs the weak air flow. Therefore, output valve 145, which is connected to output duct 143, is no longer activated and working air pressure can pass through.

Figure 12:
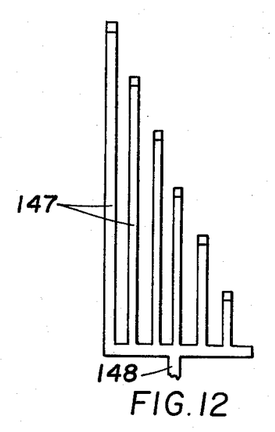
FIG. 12 is an end view and FIG. 12a is a top view of yet another embodiment of the control system illustrated in FIGS. 1 and 10.
Figure 12A:
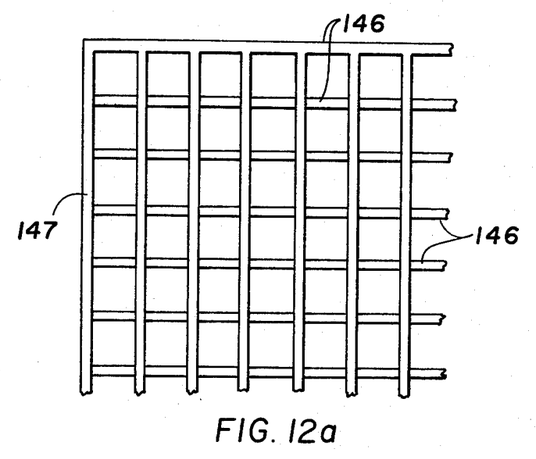

In the embodiment of the invention shown in FIG. 12, the individual input ducts 146 are at differing levels and each is connected separately to output ducts 147 which end in a connecting channel 148.

Figure 13:
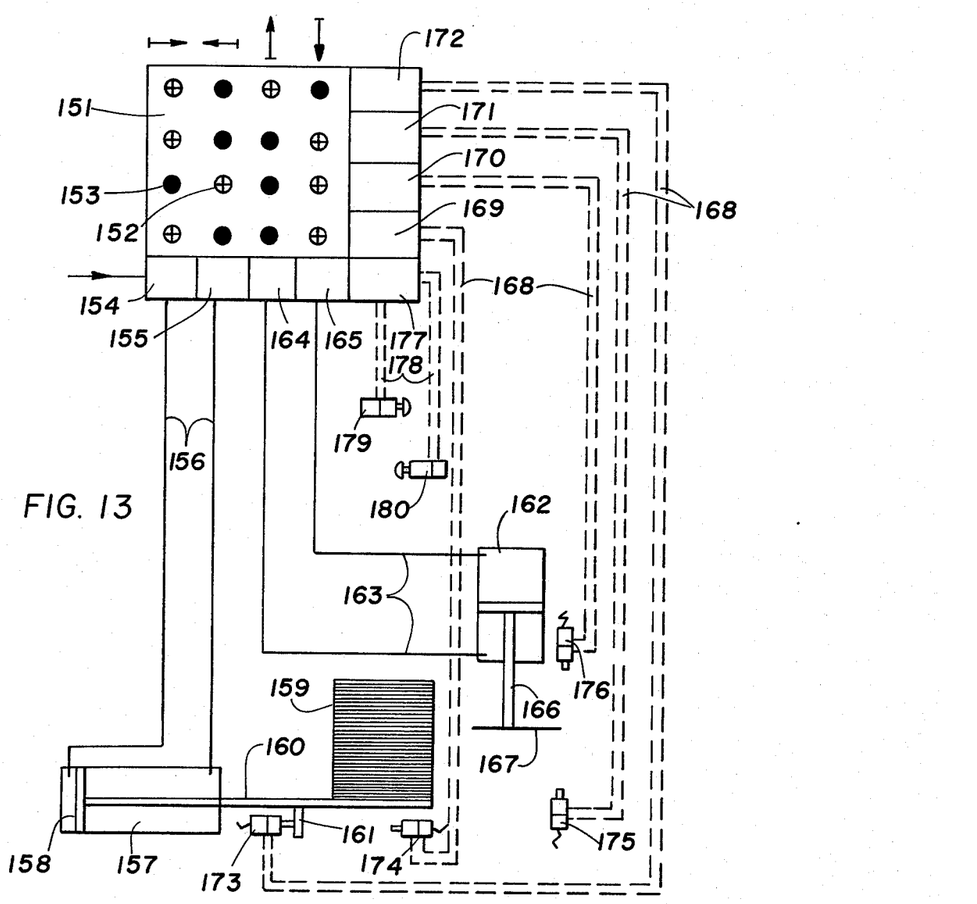
FIG. 13 illustrates, in schematic form, the use of the control system, in conjunction with a deep-drawing process.

In the embodiment shown in FIG. 13, control system 151 includes open cross-links 153 and closed cross-links 152, which together determine the application of control air. As shown, pressure cylinder 157 is connected, via ducts 156, to output valves 154 and 155. The piston 158 of cylinder 157 controls the feeding of material held in magazine 159. Piston 158 is equipped with a bar 160 having a stop 161 to limit travel thereof. The working cylinder 162 gets its working air pressure via ducts 163 connected to servo-valves 164 and 165. Piston 166 of cylinder 162 also has a stop 167 to limit travel. Input valves 169, 170, 171 and 172 are connected by control ducts 168 to a plurality of limit valves 173, 174, 175 and 176.

Two manually actuated valves 179 and 180 are connected, via ducts 178, to a corner unit, for example, the corner unit in stage C of FIG. 5. Thus, compressed air is supplied to the corner units and, therefore, also to the input and output valves, which can thus be controlled. The illustrative deep-draw press connected to the control system of FIG. 6 operates as follows: the receding piston 158 in feed cylinder 157 causes stop 161 to impact, and actuate, limit valve 173, thus control pressure is applied through input valve 172. This, in turn, opens the output valve 165 and air flows into cylinder 162, causing piston 166 to move downward. Stop 167 actuates limit valve 175 at the end of the motion, closing input valve 172 and output valve 165 and opening input valve 171, which, in turn, opens output valve 164, causing the piston 166 of working cylinder 162 to move upwards. At the end of the piston travel, limit valve 176 is actuated and input valve 171 and output valve 164 are closed. Input valve 170 is then opened, forcing compressed air into, and opening, output valve 154 so that the piston 158 of feed cylinder 157 is moved to the right, thereby extracting material from magazine 159. Limit valve 174 is simultaneously actuated, closing input valve 170 and output valve 154 and opening input valve 169. Thus, output valve 155 causes cylinder 157 to return to its original position. The closing of the preceding stages of input valves, by actuation of an input valve, may be effected as described with reference to FIGS. 5 and 6.

Manually operated valves 179 and 180 move control members within corner valve 177, so that the supply of compressed air to the input valves and/or the output valves is alternately cut on or off, thereby causing the press to operate or not, as the case may be.

One skilled in the art will appreciate that instead of using the building block approach, all systems disclosed above may be assembled from discrete valve units interconnected with short pipes or hoses, as shown in FIG. 2. Clearly also, the invention is not limited to use with compressed air; any suitable fluid, gaseous or liquid, may be substituted therefor.

One skilled in the art may make various other changes and substitutions in the layout of parts without departing from the spirit and scope of the invention.

What I claim is:

1. Apparatus for the programmed control of the flow of a compressed fluid, which comprises
    1. a source of compressed fluid, 2. a plurality of substantially identical, interconnected valve stages, each valve stage including
      a. at least one slide valve having a housing and a slidable piston therein, the piston having respective end faces defining respective chambers with the housing and further defining an annular groove between the end faces, and the valve housing having a fluid input duct connected to said source of compressed fluid and a fluid output duct in communication with the annular groove,
      b. a check valve having an input end and an output end, and
      c. conduit means for supplying a control signal of compressed fluid to the input end of the check valve and to one of the valve chambers whereby the check valve and the slide valve are opened and the output duct receives compressed fluid through the annular groove, and
   3. further conduit means interconnecting the output end of each check valve of each stage with the other valve chamber of each valve of each stage and with the output end of the corresponding check valve in the other valve stages.

2. The apparatus of claim 1, further comprising a throttled bore connecting the further conduit means to the atmosphere.

3. The apparatus of claim 1, further comprising a fluid reservoir having a throttled bore connecting the reservoir to the atmosphere, the further conduit means including a first duct connecting the output end of the check valve to the reservoir for transmitting compressed fluid thereto, and a second duct interconnecting the reservoir with the other valve chamber.

4. The apparatus of claim 1, further comprising an exhaust valve associated with each of the slide valves in the conduit means of each of the valve stages for receiving the control signal, each exhaust valve defining two chambers simultaneously receiving compressed fluid upon application of the control signal, one of the exhaust valve chambers being connected to one of the slide valve chambers and the other exhaust valve chamber being connected to the other slide valve chamber.

5. The apparatus of claim 1, further comprising a return check valve in the conduit means of at least one of the valve stages, the return check valve having an input duct and two output ducts, the input duct receiving the control signal to open the return check valve, and the output ducts being connected to a respective one of the slide valve chambers.

6. The apparatus of claim 5, further comprising a main exhaust valve in the conduit means of at least one of the valve stages, one of the return check valve output ducts being connected to the main exhaust valve for closing the same, an exhaust valve associated with each of the slide valves in the conduit means of each of the valve stages, each exhaust valve defining two chambers simultaneously receiving compressed fluid upon application of the control signal, one of the exhaust valve chambers being connected to one of the slide valve chambers and the other exhaust valve chamber being connected to the other slide valve chamber, a fluid reservoir in the conduit means and connected to the one return check valve output duct for receiving compressed fluid upon application of the control signal and further connected to the exhaust valve for transmitting the compressed fluid from the reservoir to the exhaust valve, a duct connecting the fluid reservoir to the main exhaust valve for transmitting compressed air to the main exhaust valve for opening the same, and a return check valve in the duct.

7. The apparatus of claim 5, further comprising an input check valve associated with the return check valve and arranged in the conduit means between the compressed fluid source and the return check valve, the input check valve having an output receiving compressed air upon application of the control signal, and the output of the input check valve being connected to the fluid output duct of another one of the valve stages.

8. The apparatus of claim 1, further comprising a building block defining a compressed fluid reservoir in communication with the further conduit means, an input check valve arranged between the compressed fluid source and the reservoir for supplying compressed fluid thereto upon application of the control signal, and the capacity of the reservoir being sufficiently large to contain sufficient compressed air for terminating the operation of the slide valves after the input check valve has discontinued the supply of compressed fluid from the source.

* * * * *